S. VAN HORN.

Steam or Water Gates.

No. 147,532. Patented Feb. 17, 1874.

UNITED STATES PATENT OFFICE.

SUMNER VAN HORN, OF CHICOPEE, MASSACHUSETTS.

IMPROVEMENT IN STEAM OR WATER GATES.

Specification forming part of Letters Patent No. 147,532, dated February 17, 1874; application filed April 21, 1873.

*To all whom it may concern:*

Be it known that I, SUMNER VAN HORN, of Chicopee, in the county of Hampden and State of Massachusetts, have invented a new and useful Improvement in Steam or Water Gates; and I do hereby declare that the following is a full, clear, and exact description thereof, reference being had to the accompanying drawings, making a part of this specification, and to the letters of reference marked thereon, in which—

Figure 1:
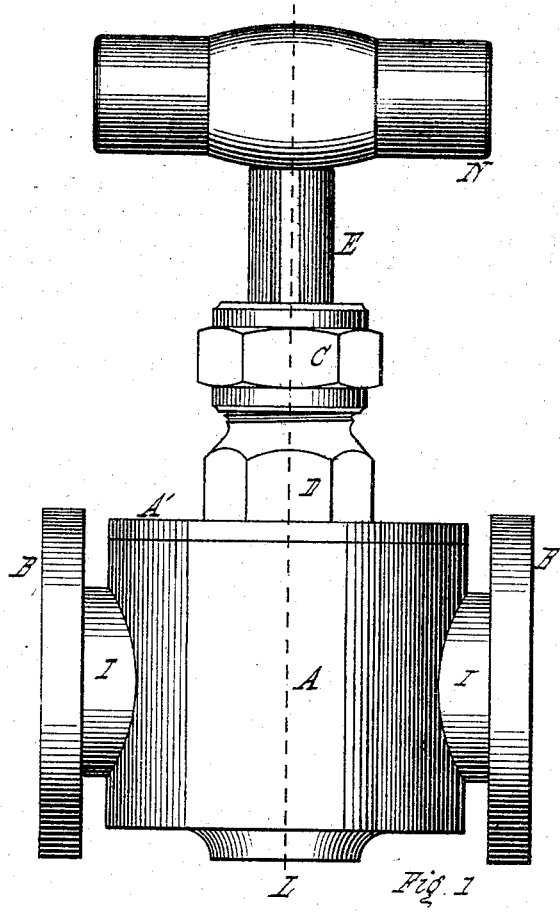
Figure 2:
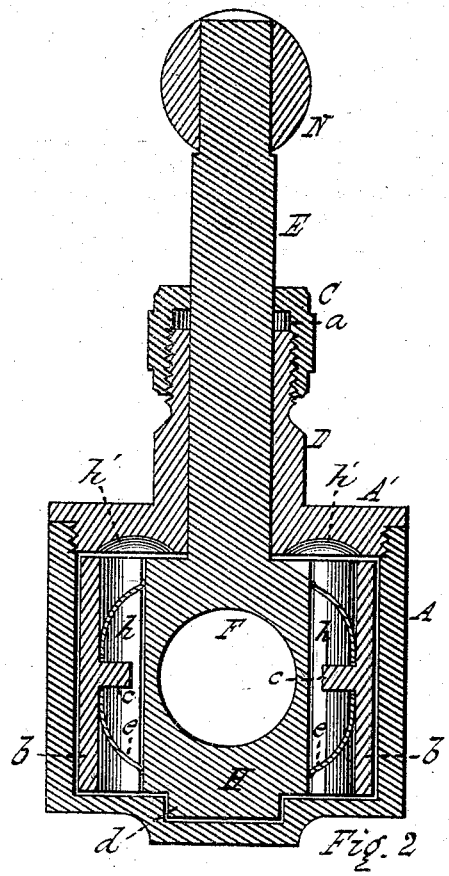

Figure 1 is a side view of my invention. Fig. 2 is a vertical section through line L of Fig. 1; and Fig. 3 is a reverse plan view of the plug and cap, showing the removable cut-offs as in position in the plug.

My invention relates to an improved gate for controlling the flow of water or steam through pipes; and it consists of a cylindrical or other convenient-shaped shell, in which is fitted an oblong plug having removable pieces or plates fitted in each side thereof, the exterior face of which pieces are fitted against the interior of the shell, said pieces or plates being forced out against the interior of the shell by springs, and by the steam or water admitted to the shell. A straight hole is made entirely through the plug, which, when the plug is turned into the proper position, furnishes a straight and uninterrupted water or steam way through the gate; but when the plug is turned into a position with the hole therein extending at right angles to the connecting-pipe, the removable cut-off on each side the plug covers the aperture in the shell leading to the pipe at each side the plug, and the steam or water in the shell operates to force the cut-offs on one side firmly against the interior of the shell, and stopping the aperture leading to the outlet-pipe. The plug is turned in the shell by a spindle, which extends up through the cover of the shell, and having a handle on the end, and the spindle is provided with an ordinary packing-nut.

That others skilled in the art may be able to make and use my invention, I will proceed to describe its construction and operation.

Figure 3:
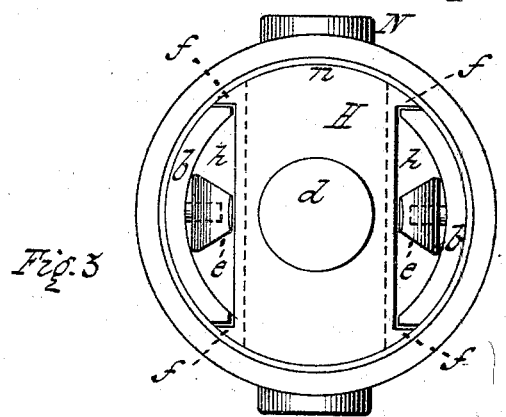

In the drawings, A represents the cylindrical shell, having orifices through the side, one opposite the other, communicating with the short pipes I, and into the top of the shell is screwed the cap A', provided with a hollow shank, D, and into the shell is fitted an oblong plug, H, each end of which is made curved or cylindrical at $n$ to fit the interior cylindrical surface of the shell A, and a vertical recess, $h$, is made in each side of the plug, leaving the sides straight, as shown at $n'$, and with a shoulder, $f$, at each end of the recess, as shown clearly in Fig. 3. Into this recess on each side of the plug is placed a curved plate, $b$, which I denominate a removable cut-off, convex on its outer face, and of the same form as the ends $n$ of the plug, so as to fit well the interior cylindrical surface of the shell. These plates extend entirely across the recesses $h$ from one shoulder, $f$, to the other, and are held in their proper vertical position by the said shoulders $f$, and a projection, $c$, may be made upon the inside of each plate, which is inserted into a hole in the bent spring $e$, the ends of which impinge against the sides of the plug, and operating to keep the plate pressed outward against the interior of the shell. A hole, F, is made entirely through the plug in a longitudinal direction, and a recess, $d'$, may be made in the bottom of the shell, with a projection or pivot, $d$, on the bottom of the plug to keep it firm when being operated. The plug H is provided with a spindle, E, extending up through the shank D, with a hand-piece on top, by which to turn it, and an ordinary packing-nut, C, is screwed upon the shank D and around the spindle E to prevent leakage. The gate may be connected to the pipes by bolting through the flanges B, or by screw-couplings, in the ordinary manner.

The operation of my invention is as follows: If the gate be connected to a steam or water pipe, and the plug H be turned by the hand-piece N, so that the hole F through the plug is in a line with the pipes I, there will then be an unobstructed water or steam passage for the flow of the water or steam through the gate; but if the plug be turned one-fourth of a revolution, or so that the length of the plug H and the hole F therein is at right angles to the line of the pipe leading in through the orifice I, then the plates or cut-offs $b$ will close the orifices through which the water or steam makes its ingress and egress to and from the interior of the shell, and the springs $e$ will force one of the said plates firmly against the interior of the shell, causing the said outlet-orifice to be stopped with a close joint, and with no leakage.

I prefer to make the shell cylindrical, as above described; but the same may be made of any desirable form, and with the plug and plates made to correspond to the form of the shell.

For many uses, a gate having only one removable plate or cut-off, $b$, would answer the same purpose without departing from the principle of operation, as either the ingress or egress orifice tightly stopped by the cut-off $b$ might be quite sufficient, for many purposes, to make a tight gate, and, whether one is used or two, the water or steam admitted to the shell through the inlet-orifice has free access into the recess $h$ and behind the plates $b$, and operates to press said plate outward and against the interior of the shell to make a tight joint at the outlet-orifice.

The plug H is not fitted so tightly to the cylindrical cavity but that the water may pass around the plug, and above it, through the recess $h'$, into the spaces $h$ between the plug and the plates $b$, and, the inner surface of the latter being concave, a large surface is exposed to the water-pressure, to more firmly hold the convex surface of the plates against the interior of the shell.

It will be seen that the plate or plates $b$ will constantly wear more perfectly to the interior surface of the shell, and the longer they are used the more perfectly will they fit the shell.

The movable plates $b$ may be fitted to the plug and into the shell sufficiently tight to require no springs, as the steam or water in the shell operates to keep the plates, or the one at the outlet-orifice, pressed against the interior of the shell when in operation; but I prefer to use the springs, as they prevent any rattling of the plates which might occur.

Having thus described my invention, what I claim as new, and desire to secure by Letters Patent, is—

The combination of the plug H, provided with the water-way F and shoulders $f$, with the concave plates $b$ and cylindrical shell A, all constructed and arranged substantially as described.

Witnesses: SUMNER VAN HORN.
T. A. CURTIS,
C. EUGENE BUCKLAND.